UNITED STATES PATENT OFFICE.

JOSEPH P. R. JAMES, OF REED'S LANDING, MINNESOTA.

IMPROVEMENT IN SUBSTITUTES FOR TOBACCO.

Specification forming part of Letters Patent No. 210,538, dated December 3, 1878; application filed November 16, 1878.

*To all whom it may concern:*

Be it known that I, JOSEPH P. R. JAMES, of Reed's Landing, in the county of Wabasha and State of Minnesota, have invented a new and valuable Improvement in Medical Compounds; and I do hereby declare that the following is a full, clear, and exact description of the construction and operation of the same.

The object of my invention is to provide a substitute for tobacco; and to this end my invention consists in providing a new and useful composition of matter by combining the following substances: spikenard, red clover, hops, slippery-elm bark, pennyroyal, mullein-leaves, kinnikinic, wild-cherry bark, hyssop, ginseng, and tarred rope, all in a dry and comminuted state.

I have discovered that this composition acts as a satisfactory substitute in cases where parties are desirous of discontinuing the use of tobacco. It satisfies the desire, allays the craving, its tonic properties give tone to the stomach, and several of the ingredients act as expectorant, promoting and inciting increased secretion of the salivary glands. Its use may be gradually discontinued as the craving becomes allayed. It is agreeable to the taste, has a pleasant odor, and is harmless.

I do not confine myself to any particular proportions of ingredients, as these may be largely varied without departing from the gist of my invention.

The expectorants which compose some of the ingredients by exciting the salivary secretion may prove useful in some diseases of the throat and bronchial tubes, as is obvious.

I claim as my invention—

The tobacco substitute herein described, consisting of spikenard, red clover, hyssop, hops, slippery-elm bark, tarred rope, pennyroyal, mullein-leaves, kinnikinic, wild-cherry bark, and ginseng, as and for the purpose specified, In testimony that I claim the above I have hereunto subscribed my name in the presence of two witnesses.

JOSEPH P. R. JAMES.

Witnesses:
 W. W. CASSIDY,
 W. C. PIERS.